(12) United States Patent
Lee (10) Patent No.: US 7,907,833 B2
(45) Date of Patent: Mar. 15, 2011

(54) APPARATUS AND METHOD FOR COMMUNICATING STOP AND PAUSE COMMANDS IN A VIDEO RECORDING AND PLAYBACK SYSTEM

(75) Inventor: Janghwan Lee, Westfield, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 2407 days.

(21) Appl. No.: 10/757,626

(22) Filed: Jan. 14, 2004

(65) Prior Publication Data

US 2005/0191031 A1 Sep. 1, 2005

(51) Int. Cl.
*H04N 5/783* (2006.01)
(52) U.S. Cl. .......... 386/343; 386/344; 386/345; 386/355
(58) Field of Classification Search .......... 386/125–126, 386/45, 46, 68
See application file for complete search history.

(56) References Cited

U.S. PATENT DOCUMENTS

| | | | |
|---|---|---|---|
| 4,963,995 A | 10/1990 | Lang | 358/335 |
| 5,732,067 A * | 3/1998 | Aotake | 369/275.3 |
| RE36,801 E | 8/2000 | Logan et al. | 348/571 |
| 7,089,579 B1 * | 8/2006 | Mao et al. | 725/109 |
| 2002/0085834 A1 * | 7/2002 | Flannery | 386/96 |

* cited by examiner

*Primary Examiner* — Thai Tran
*Assistant Examiner* — Helen Shibru
(74) *Attorney, Agent, or Firm* — Robert D. Shedd; Robert B. Levy; Jorge Tony Villabon (57) ABSTRACT

The invention provides a video recording and playback system comprising a video storing and retrieving device coupled to a video display device so as to provide the video display device with frames of video data for display. The video storing and retrieving device includes at least one memory capable of storing frames of video data, comprising packets according to a format. The format provides a trick mode indicator. A controller is coupled to the memory and controls operations of the memory. A user control device is operable with the controller to allow a user to communicate stop and pause commands to the controller. A processor cooperates with the controller so as to clear the trick mode indicator of at least one retrieved packet in response to the stop command. The processor cooperates with the controller to set the trick mode indicator of at least one retrieved packet in response to the pause command.

13 Claims, 7 Drawing Sheets

DSM_trick_mode

An eight bit field indicating the nature of the information encoded. The field is further partitioned as follows:

trick_mode_control (3 bits),
field_id (2 bits),
intra_slice_refresh (1 bit), and
frequency_truncation (2 bits).

trick_mode_control

Indicates the nature of the DSM Mode:

000 - Fast Forward
001 - Slow Motion
010 - Freeze Frame
011 - Fast reverse
1xx - Reserved.

FIGURE 6

APPARATUS AND METHOD FOR COMMUNICATING STOP AND PAUSE COMMANDS IN A VIDEO RECORDING AND PLAYBACK SYSTEM

BACKGROUND OF THE INVENTION

The present invention generally relates to controlling video playback systems, and more particularly, to a method and apparatus for communicating stop and pause commands for controlling viewing of moving pictures.

In recent years, systems for sending, storing and playing back video information and data from a wide selection of video sources have been developed. These have found widespread use among consumers. In addition to conventional video sources like digital video disks (DVD) and VCRs, video from other sources can be sent, stored and played back to a viewer at the viewer's convenience. Video sources include cable, satellite and broadcast television sources, as well as the Internet. One example of a commercially available storage and playback system is Personal Television (PTV). PTV refers to the viewing of live television programming in a manner that gives the viewer flexible viewing options, for example, pause and rewind. PTV is also known as Personalized TV, Personal TV Service, File-served Television, Time Delay Recording, Time Shifting and Individualized TV.

One of the video playback features highly desired by consumers is generally referred to in the art as "trick play". The term "trick play" refers to using controls such as pause, instant replay, rewind etc. to control the video presentation. One reason this is referred to as "trick play" is because these operations can be performed while watching live TV in near real time. In order to implement such features, video signals (including live TV signals), are typically stored in a memory device, e.g., a hard drive, before being provided to a display unit for display to the consumer.

Another feature desired by consumers is the ability to stop the presentation of a show. The stop command differs from the pause command (also referred to as "freeze"). While both commands typically stop the presentation of moving pictures, the pause command results in display of a still video frame of the motion picture. The stop command stops the presentation but does not display a still video frame of the moving picture. Implementing both the stop and the pause features can be problematic for recording and playback systems. In most cases, the decoder in the display device is not under the control of the recorder and playback system. If the recorder/player stops sending frames in response to both the stop and pause commands, it is difficult for the decoder to distinguish between the stop and pause commands. Furthermore, for a pause command, the decoder is typically unable to determine how many times a particular picture will be displayed. This uncertainty interferes with the display order of the pictures being transferred to the display device.

Therefore, a need exists for improved systems and methods for implementing the STOP and PAUSE features for such devices.

SUMMARY OF THE INVENTION

The invention provides a video recording and playback system comprising a video storing and retrieving device coupled to a video display device so as to provide the video display device with frames of video data for display. The video storing and retrieving device includes at least one memory capable of storing frames of video data, comprising packets according to a format. The format provides a trick mode indicator. A controller is coupled to the memory and controls operations of the memory. A user control device is operable with the controller to allow a user to communicate stop and pause commands to the controller. A processor cooperates with the controller so as to clear the trick mode indicator of at least one retrieved packet in response to the stop command. The processor and controller set the trick mode indicator of at least one retrieved packet in response to the pause command.

DETAILED DESCRIPTION

Definitions and Examples of Applicable Industry Standards

The following terms are defined as used herein. A "system" refers to any collection of communicating elements that performs at least one function. The term "connection" refers broadly to any transport capability to transfer information between two or more end points. Accordingly, the invention is applicable to a wide range of physical networks and systems with different realizations of connections, including bidirectional, one way, and point to multi-point (broadcast) connections.

A "command" in the present context means any expression, in any language, code or notation, of a set of instructions intended to cause a system to perform a particular function either directly or indirectly. Particular functions include those functions performed after either or both of the following a) conversion from one language, code or notation to another language, code or notation; b) reproduction in a different material form.

In the context of video playback systems, the following definitions are used herein. The terms "Play" and "Resume" refer to commands that start a presentation, e.g., a movie, from the beginning or resume after stopping or pausing the movie. The term "Stop" means to Stop the presentation of the movie. The term "Pause" means to freeze the picture on the display.

Digital television standards suitable for implementing the invention include Digital Video Broadcast (DVB) standards, as well as those described by the ATSC DIGITAL TELEVISION STANDARD, Advanced Television Systems Committee, Doc A/53, Sep. 16, 1995.

An example system embodiment employs the MPEG-2 systems and video stream syntax of ISO/IEC 13818-1 & 2, INFORMATION TECHNOLOGY—GENERIC CODING OF MOVING PICTURES AND ASSOCIATED AUDIO INFORMATION, International Standards Organization, 1995, Sep. 16, 1995. In particular, the ATSC DIGITAL TELEVISION STANDARD describes a model for a hypothetical ancillary services target system decoder for a DTV receiver.

The International Standards Organization provides "Digital Storage Media Command and Control (DSM-CC)" standards. This standard provides for certain client/server operations such as video control (backward, pause, etc.), video transmission, and video service discovery.

In 1998, this standard was extended and became Part 6 of the current MPEG-2 standard. DSM-CC itself is not developed for datacast, but some parts of DSM-CC, e.g., the Data Download Protocol, DSM-CC sections (a packet encapsulation on top of the PES), and the basic scheme of its service discovery, are adopted by both ATSC and DVB datacast standards.

The DVB standards disclose a DVB signal to be carried over a range of bearer networks. Various standards have evolved which define transmission over particular types of links. These standards include: DVB-S (Satellite); ETS 300 421 (Digital Satellite Transmission Systems); DVB-T (Terrestrial) ETS 300 744 (Digital Terrestrial Transmission Systems); Interfaces to Plesiochronous Digital Hierarchy (PDH) networks (prETS 300 813); Interfaces to Synchronous Digital Hierarchy (SDH) networks (prETS 300 814); Interfaces to Asynchronous Transfer Mode (ATM) networks (prETS 300 815); Interfaces for CATV/SMATV Headends and similar Professional Equipment (EN50083-9).

Each of the above standards is readily available in the literature and the contents thereof are familiar to those of ordinary skill in the art.

Figure 1:
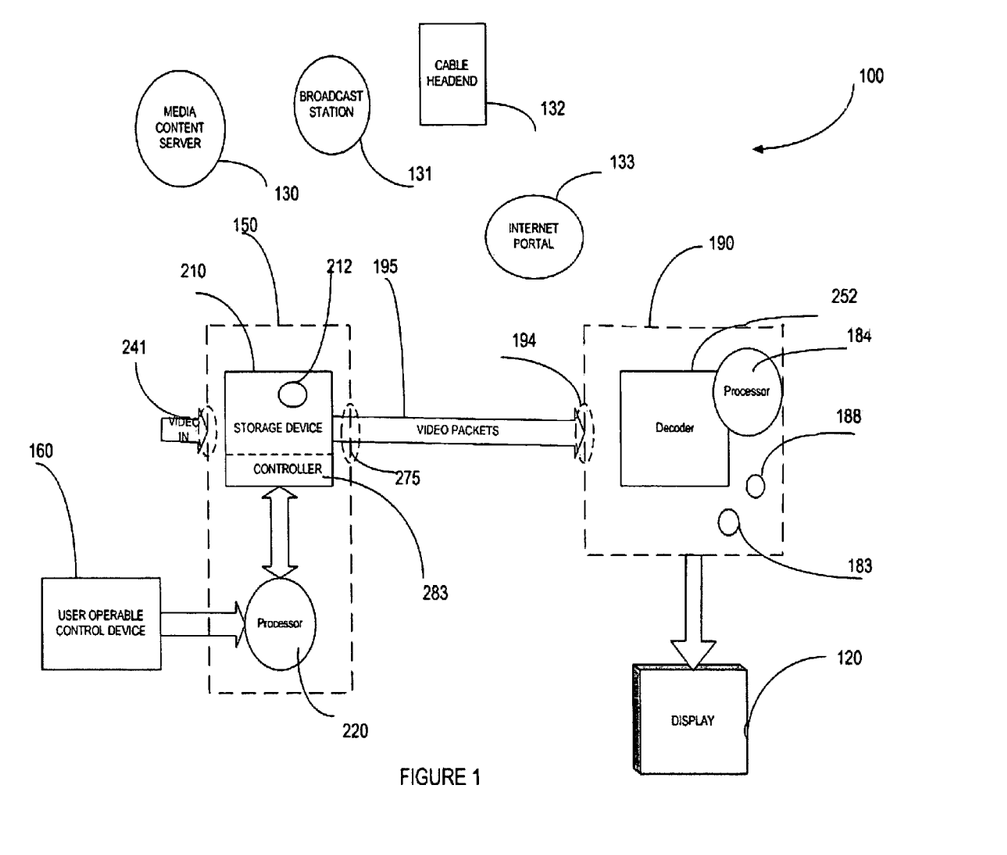
FIG. 1 is a block diagram illustrating an example of a recording and playback system in accordance with an embodiment of the invention.

FIG. 1

General System Description

Figure 2:
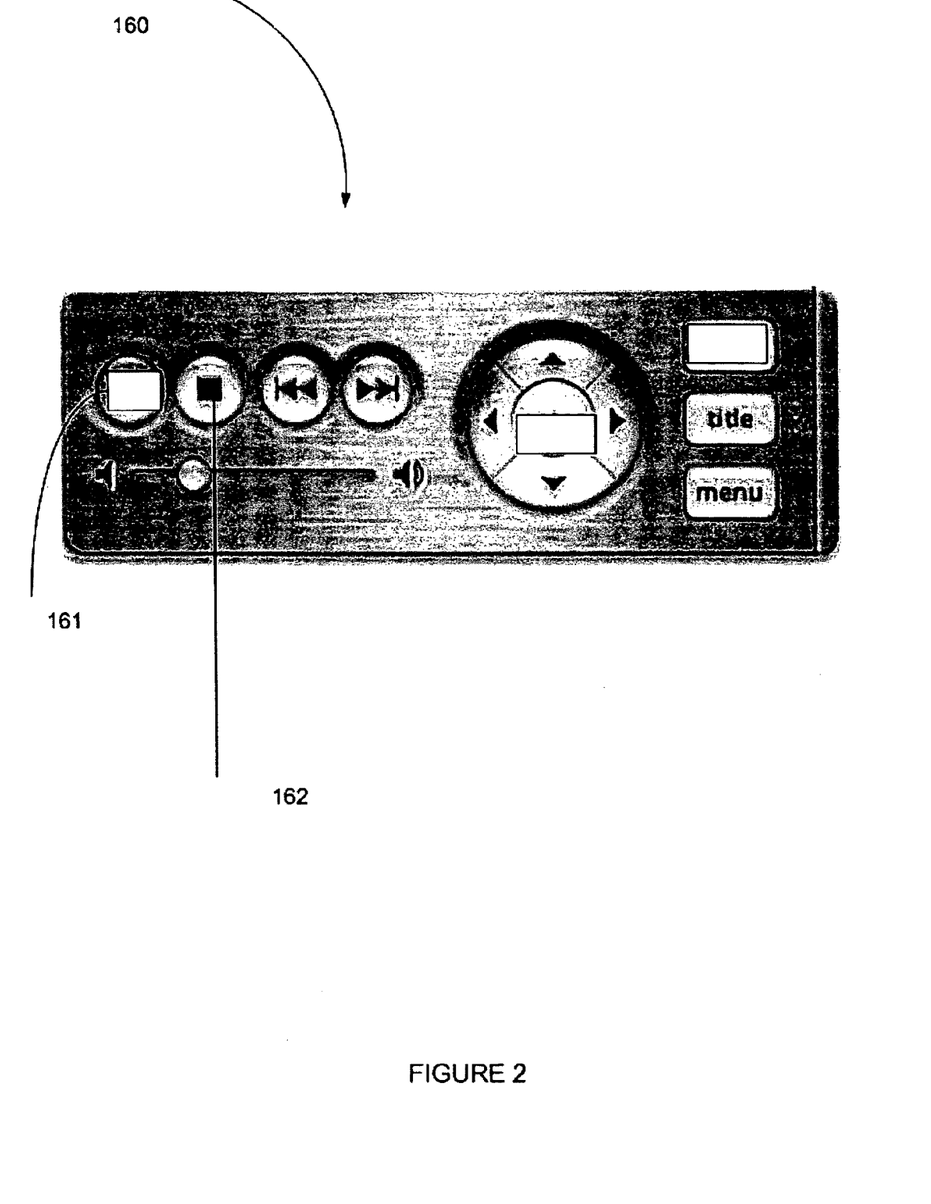
FIG. 2 illustrates an example of a user operable control device in accordance with an embodiment of the invention.

FIG. 1 is a simplified block diagram of a video system 100 according to an embodiment of the invention. As illustrated in FIG. 1, system 100 comprises a sender 150 capable of communicating with a receiver 190. Sender 150 provides a packetized data stream 195 to receiver 190 via a communication link. Packetized data stream 195 transports video images, for example, a plurality of successive video frames comprising a moving picture for display on a display device 120. Receiver 190 is capable of receiving packetized data stream 195 including the video images and displaying the images on a display 120. System 100 further includes at least one user operable control device 160. User operable control device 160 is capable of communicating user commands to sender 150 to control the display of images on display 120. In one embodiment of the invention, user operable control device 160 is provided on a front panel of a housing of sender 150. FIG. 2 is an example of a suitable user operable control device 160 implemented on a front panel of the main body of a DVD video recorder/player.

Figure 3:
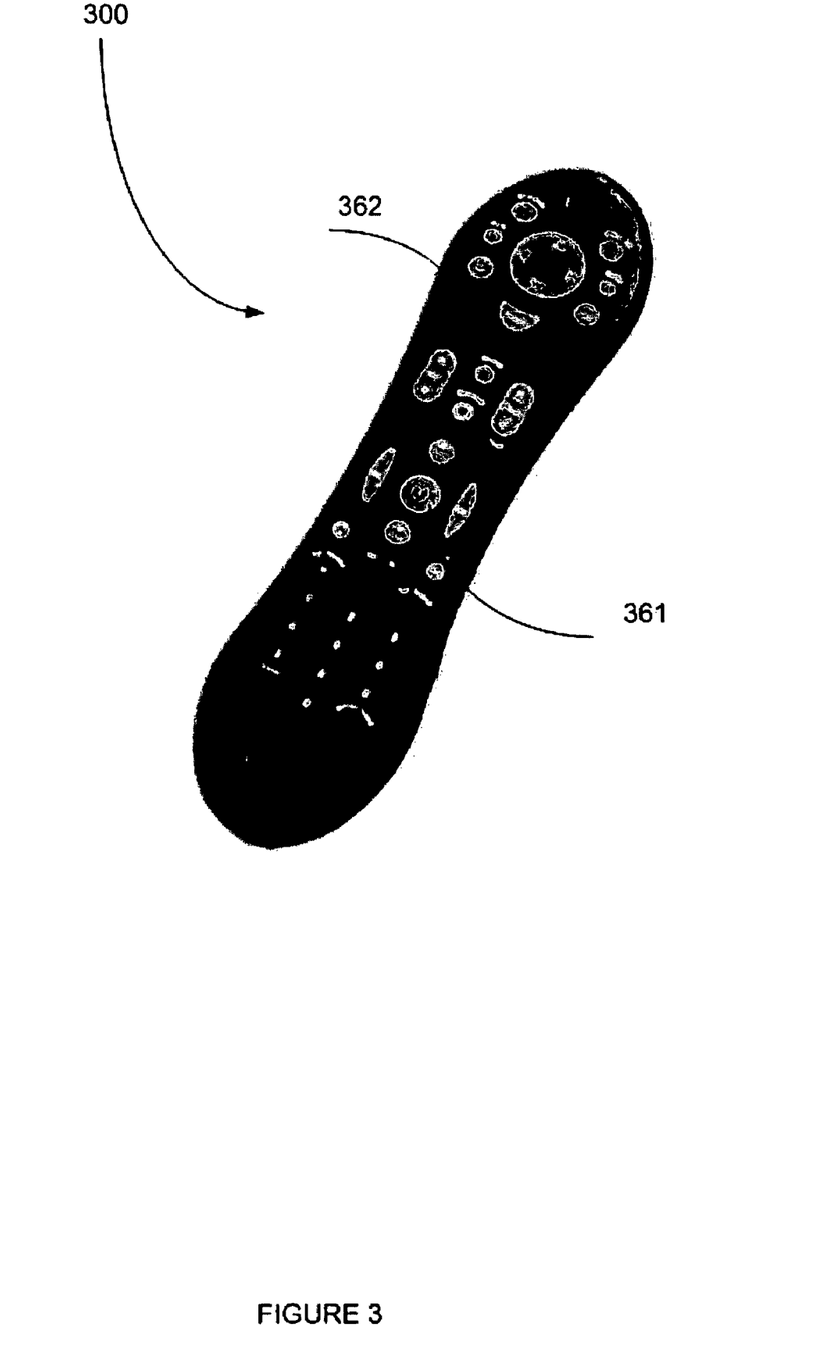
FIG. 3 illustrates an example of a hand held remote user operable control device in accordance with an embodiment of the invention.

In another embodiment of the invention, user operable control device 160 comprises a remote user operable control device, for example, a conventional hand held remote control device. FIG. 3 illustrates a conventional hand held user operable control device according to an embodiment of the invention. Such devices typically communicate user commands via electromagnetic or infrared radiation to sender 150 as is known in the art. As those of ordinary skill in the art will readily appreciate, there exists a wide variety of user control devices of various shapes, sizes and communicating protocols, for controlling recording and playback systems. The present invention is capable of implementation using any of these conventional devices.

In one embodiment of the invention, video system 100 is implemented at least in part by a personal video recording system (PVR). In another embodiment of the invention, video system 100 is implemented, at least in part, by an integrated television system such as an integrated High Definition Television (HDTV) system. Integrated HDTV systems are manufactured with both the HDTV monitor and HDTV tuner in a single unit.

For purposes of explanation and example, FIG. 1 illustrates one each of sender 150, receiver 190 and display device 120. In practice however, it is contemplated that any number of such senders, receivers and displays will be included in system 100. For example, embodiments of system 100 include one or more senders 150 communicating with one or more receivers 190 within a household or for a plurality of households and subscribers.

As those of ordinary skill in the art will readily appreciate upon reading this specification, the invention is capable of implementation in a variety of video system environments, including non-homogeneous hardware and software environments. Accordingly, an embodiment of video system 100 can be described broadly as comprising a client i.e., a consumer of multi-media content and a server, i.e., an entity that provides multi-media content and services. In an embodiment of the invention, system 100 comprises a distributed system and includes multiple computing platforms, including video systems (sometimes referred to as "pumps") 130 providing video, for example, a video on demand service. In one embodiment of the invention, sender 150 is implemented in a "client" of such a system 100. In an alternative embodiment of the invention, sender 150 is implemented in a server of such a system.

System 100 is capable of implementation in networks that support Digital Storage Media Command and Control (DSM-CC). DSM-CC is a standard for the delivery of multimedia broadband services. DSM-CC is defined in part 6 of the MPEG-2 standard (MPEG-2 ISO/IEC 13818-6 Extensions for DSM-CC) and is known to those of ordinary skill in the art. DSM-CC embodiments include Hybrid Fiber Coax (HFC) and Fiber to the Curb (FTTC) embodiments. In one embodiment of the invention, HFC network connections are realized using an MPEG-2 TS in the downstream (Server to Client) direction and a packet contention scheme in the other direction. Other embodiments of the invention include FTTC networks realizing connections as bi-directional ATM Virtual Channel Connections (VCC's). In an embodiment of the invention, sender 150 is connected to a standard ATM backbone network while receiver 190 client connects to an access network (such as HFC or FTTC).

User Commands

Regardless of the complexity of the particular implementation, system 100 includes a user operable control device 160 capable of communicating a plurality of playback control commands to sender 150. In one embodiment of the invention, these commands include "trick mode" commands. The plurality of user commands includes at least two types of commands. A first type of command is a type that causes display device 120 to stop displaying video images. An example of this type of command includes the "stop" command, as generally known in the art. However, the particular name given to the first type of command is not intended to limit the invention. The first type of command is any command that results in stopping the presentation of video images on display device 120. All commands of this type are considered first type commands and are within the scope of the invention, regardless of command name in any language, and regardless of how the stopping is accomplished.

According to one embodiment of the invention, user commands further include a second type of command. The second type of command is one that is intended to cause repeated display of the same video image on display device 120. Examples of second types of commands include "pause", and "freeze" commands. As stated above, the command name is not intended to be limiting of the invention. Any command that causes repeated display of the same video image on display device 120, thereby creating the impression of a still image, is a second type of command.

The first type command and the second type command are intended to have different display effects on system 100. Existing MPEG standards include a format that allows implementing a freeze (pause) command in trick mode. However, most devices presently available with trick mode capability don't continue to send packetized video streams to the display decoder (for example, receiver 190) in freeze mode. Instead, these devices stop sending the MPEG stream. Central Processing Unit (CPU) bandwidth can be conserved in this manner. Nevertheless, this practice presents difficulties for the decoder in receiver 190. That is, both types of commands result in stopping data input to the frame decoder of receiver 190. In such systems, the frame decoder portion of receiver 190 is not typically under control of user operable control device 160 and does not directly receive user commands from device 160. Therefore, the frame decoder of receiver 190 cannot determine which command caused the data input to stop.

Inventive Solution

A solution to the problem described above is provided by a method and apparatus according to an embodiment of the invention. According to one embodiment of the invention, when sender 150 receives a command from user operable control device 160, sender 150 responds by providing at least one corresponding command indicator in packetized data 195. Packetized data 195, including the at least one command indicator, is then provided by sender 150 to receiver 190. Based upon the at least one command indicator, a command decoder of receiver 190 determines the command type, and specifically, determines whether the command is a first type command or a second type command. Therefore, receiver 190 can distinguish between first type and second type commands, and respond appropriately even when packetized data stream 195 stops for both command types.

Detailed System 100 Description

FIG. 1 illustrates logical and functional components of a video system 100 according to one embodiment of the invention. The illustrated functions and components are capable of implementation in hardware, software and various combinations thereof. Furthermore, the functions of video system 100 as illustrated in FIG. 1 are combinable and distributable over physical system components. Furthermore, functions are capable of combining and housing in a single physical enclosure or they may be distributed over two or more separate enclosures and operatively interconnected by wires, cables, wireless or other signal conveying means. Regardless of implementation, one embodiment of system 100 comprises at least one sender 150, at least one receiver 190, and at least one user operable control device 160.

Sender 150

General

Sender 150 stores and retrieves moving pictures in any MPEG-2 compliant packet format. Products and technology, and associated implementation standards, are available for encoding and transmitting an MPEG-2 compliant video stream from a video content source (130, 131 132) to sender 150 over a variety of links. These include: Radio Frequency Links (UHF/VHF); Digital Broadcast Satellite Links; Cable TV Networks; Standard Terrestrial Communication Links (PDH, SDH); Microwave Line of Sight (LoS) Links (wireless); Digital Subscriber Links (ADSL family); and Packet/Cell Links (ATM, IP, IPv6, Ethernet).

Therefore, sender 150 is capable of implementation in a variety of commercial systems. These include Personal Video Recorders (PVR), Digital VCRs, Digital Video Recorders (DVR), Digital Videocassette Recorders, Personalized TV Playback Devices, Digital Disk Recorders, Home Media Servers, Personal Computers, Virtual VCRs, IP Media Appliances, Digital Network Recorders, Digital Videotape Recorders and Videodisc Recorders and Players.

In one embodiment of the invention, sender 150 includes at least one input 241 for receiving a video signal from a video content source. Examples of suitable video content sources include video pump 130, broadcast station 131, cable head-end 132 and internet portal 133 and further include the sources identified above. The video signal received at input 241 includes images to be played back on a display device 120. Commercially available hardware and software is readily available for delivering video signals from these sources, decoding the signals and delivering the signal to the input of a recording device.

Sender 150 further includes at least one video storage device 210 for storing at least a portion of the video images to be played back, and at least one video output 275 for providing video images, in packetized format, to receiver 190 for display. The operation of sender 150 is at least partially controllable by a user in accordance with the user commands described herein including at least a first type of command and a second type of command. Sender 150 further includes at least one processor 220 for receiving and encoding user commands including at least stop and pause commands, from user operable control device 160.

Input 241

As will be appreciated further from the following discussion, input 241 is capable of receiving MPEG-2 compliant video signals from at least one of a variety of video content sources. Suitable video content sources include, analog and digital TV broadcasting systems, cable and satellite television systems, video and film production systems, multi-point video conferencing systems, digital video recording applications, real-time video transport systems, video monitoring systems, law enforcement and public safety applications, video encoding and editing systems and broadband video on-demand (VOD) systems.

A variety of suitable communication links, including analog and digital communication links exist and are suitable for implementing the invention. Some examples include, but are not limited to, T1/E1 and Ethernet/IP (Internet Protocol) links, broadcast television over the Internet (TV over IP), Integrated Service Digital Networks (ISDN), Public Switched Telephone Networks, cable television networks including cable head-end links and subscriber networks, satellite links, microwave and power line communication links, fiber optic links and wireless communication links. In one embodiment of the invention, MPEG compatible input video streams are received at input 241. In one embodiment of the invention, input 241 is capable of receiving a radio frequency carrier modulated responsive to a Motion Picture Experts Group (MPEG) compatible signal. Video signals suitable for the invention include digital and analog signals in compressed and uncompressed formats.

Functions of Sender 150

In one example embodiment of the invention, sender 150 is an integrated Digital Video Broadcast (DVB) receiver capable of receiving, demultiplexing and decoding MPEG signals. In another example embodiment of the invention, MPEG compatible input video streams are received at input 241. Sender 150 demodulates and processes the received signal in accordance with MPEG standards.

Examples of MPEG standards suitable for use in system 100 include those recommended by ISO/IEC JTC 1/SC29/WG11 (International Standardization Organization/International Electrotechnical Commission Joint Technical Committee 1/Sub Committee 29/Working Group 11) for storing video in digital storage media (DSM), for example storage media 212 of sender 150. Other suitable standards include the MPEG-2 standard for high definition digital broadcasting such as EDTV (Enhanced Digital Television) and HDTV (High definition Television).

In one embodiment of the invention, a carrier modulated according to known methods includes MPEG compatible signals and is received by sender 150 via input 241. Sender 150 tunes to the frequency in which programs to be recorded and played back are multiplexed, and demodulates and error corrects bit streams corresponding to selected programs. In an embodiment of the invention, sender 150 converts a received bitstream into a transport stream (TS) defined by MPEG2 system, and demultiplexes an audio or video PES packet of a program from the TS and outputs a PES packet to storage subsystem 150.

In another embodiment of the invention, sender 150 receives analog signals via input 241. In such an embodiment, sender 150 digitizes, encodes and, in some embodiments compresses the analog video signal. An embodiment of the invention includes a decoder according to the conceptual model for a transport stream system target decoder (T-STD) described in the ISO/IEC 13818-1:1996 (MPEG-2) standard. The MPEG-2 conceptual T-STD model comprises an individual system target decoder for each of the elementary data streams representing the video, audio, and system information components of a television program. In that embodiment, sender 150 receives the television program information and provides a digitally encoded, compressed video stream compatible for recording onto storage medium 212 by storage device 210.

In one mode of operation, sender 150 continuously digitizes, compresses and stores video signals received via input 241. For example, sender 150 receives programming during a time interval selected by a user. Sender 150 compresses and encodes the program video and provides compressed video to storage device 210 for temporary storage on storage medium 212. During playback, sender 150 retrieves the compressed data from storage medium 212 and decompresses and decodes the video.

In yet another embodiment of the invention, sender 150 receives and encodes real time streams of television and video and provides the encoded streams to video storage medium 212 for near real time playback and viewing on display 120.

In one embodiment of the invention, sender 150 is implemented in a cable television set top box (STB) capable of receiving video images via video input 241 from a cable network distribution system. In another embodiment of the invention, sender 150 is implemented in a satellite receiver capable of receiving video images via video input 241 from a satellite downlink, receive antenna or other video signal supplying means.

In one embodiment of the invention, sender 150 is housed in a local tuner/receiver, that is, sender 150 is physically located within a broadcast or cable video tuner/receiver (not shown) at a viewer's site, for example at a viewer's home, along with receiver 190 and display 120. In one embodiment of the invention, sender 150 includes a media player, for example a digital video disk (DVD) player for playing back video images from a storage medium such as digital video disk. (DVD) In that case, input 241 is in communication with a storage device controller 283 that provides images from storage medium 212 in accordance with user commands.

In an alternative embodiment of the invention, sender 150 is a remote sender, for example, located at a cable headend site, or on board a satellite. In that case, sender 150 is capable of receiving and responding to commands from a remote user operable control device 160, for example, via a satellite uplink, Out of Band (OOB) communications channel, or another suitable communications uplink. At present, trick play commands are precluded from transmission in a broadcast MPEG stream. However, this is a regulatory constraint and a not a restraint imposed by the available technology for implementing bidirectional communications between user operable control devices and other system components.

In another embodiment of the invention, system 100 includes Interactive Video on Demand (IVOD) capability. IVOD Is an extension of VOD (Video on Demand) in which trick play functions such as fast forward, fast rewind, and pause are implemented. One IVOD system implementation of the invention includes three components: (1) sender 150 comprising the user's "Set-top Box", (2) the network providing input at input 241 (3) servers 130 with archives of movies (or whatever the server is offering to show.) The consumers communicate with the IVOD server via their set-top boxes.

Storage Device 210

Sender 150 provides selected, received and processed video signals for storage by storage device 210. In one embodiment of the invention, sender 150 provides signals in accordance with a DSM-CC (Digital Storage Media-Command and Control) ISO/IEC standard for the delivery of multimedia broadband services. DSM-CC is defined in part 6 of the MPEG-2 standard (MPEG-2 ISO/IEC 13818-6 Extensions for DSM-CC). Storage device 210 records the audio or video PES packet input onto storage media 212.

In embodiments of the invention wherein system 100 comprises a Personal Video Recorder (PVR), sender 150 typically includes the circuits of the PVR that compress the signal of, for example, a live TV show, and save the show on storage medium 212. Sender 150 subsequently, in one embodiment with about a 0-3 second delay, provides the stored show to receiver 190 for display to a viewer. In that case, the viewer is watching the video from storage medium 212, not directly from the antenna, satellite or cable connection at input 241.

In another embodiment, the PVR receives an already digitally encoded signal. In that case sender 150 stores the encoded signal. Examples of encoded video signal sources include, but are not limited to, cable headends, satellites, digital video broadcast sources, etc.

In one embodiment of the invention, storage medium 212 is temporary, for example, a buffer memory. Examples of other suitable storage medium 212 include semiconductor memories, optical storage media, magnetic storage media, and any media capable of storing compressed video signals. When playing back the stored encoded digital signal, sender 150 provides the stored digitally encoded signal to receiver 190.

Generally, storage medium 212 is any storage medium suitable for storing video information.

In one embodiment of the invention, storage medium 212 is suitable for storing an audio or video PES packet included in a MPEG2 transport stream. Suitable storage media include both removable and fixed storage media and digital storage media (DSM), for example, read-only DVD video (or DVD-ROM), write-once DVD-R, recordable/readable DVD-RW (or DVD-RAM), hard disk drives, optical storage media and the like. Exemplary embodiments of storage medium 212 include DSM implemented as random access memory logic as well as hard disk drives. Commercially available hardware is adequate for use in the invention.

The DVD video (DVD-ROM) standards support MPEG2 as a moving picture compression scheme in accordance with the MPEG2 system layer. Furthermore, DVD video standards are configured by adding presentation control data (navigation data) for fastforward, rewind, data search, and the like. In an embodiment of the invention storage media 212 is formatted according to a standard supporting the UDF Bridge format (a hybrid of UDF and ISO9660) thereby allowing computers to read the stored data.

Processor 220

In addition to storage device 210, sender 150 includes a storage device controller 283 and processor 220. Commercially available storage device controllers include one or more processors. Typical commercial controllers include circuits operatively coupled to input 241, user operable control device 160 and storage device 210 for controlling recording and playback of the video information to and from storage media 212. For example, in an embodiment of the invention, controller 283 analyzes the incoming MPEG video stream and controls writing to storage medium 212. Processor 220 is representative of a processor that implements an inventive command encoder according to an embodiment of the invention. Those of ordinary skill in the art will recognize that the actual processor employed to implement processor 220 of the invention is locatable in controller 283, as well as in other circuits of sender 150. Further, it is anticipated that embodiments of the invention will implement the functions of processor 220 in a distributed manner.

User Operable Control Device 160

User operable control device 160 cooperates with processor 220 to permit a viewer to control recording and retrieval of video images to and from storage media 212. FIG. 2 is an example of a suitable user operable control device 160 implemented on a front panel of the main body of a conventional set top box. Fundamental operations are made by user operation of control keys 161 and 162. For example, user activation of STOP key 162 stops the video presentation. User activation of PAUSE key 161 pauses, or freezes, the presentation. Embodiments of the invention include front panels of DVD video recorders incorporating basic operation keys such as a power switch button, open/close key, playback key, stop key, chapter/program skip key, rewind key, fast forward key, recording start button (not shown), and the like.

In one embodiment of the invention, various fundamental operations are performed by user operation of a remote controller 300 as illustrated in FIG. 3. STOP and PAUSE commands are performed by user activation of PAUSE key 361 and STOP key 362.

Regardless of the source and device employed to provide the STOP and PAUSE user commands, the invention provides the capability for communicating STOP and PAUSE commands from sender 150 to receiver 190. In an embodiment of user operable control device 160, the operation of the STOP and PAUSE keys are as follows. When STOP key 162 is pressed during disc playback or recording, playback or recording is stopped. When PAUSE key 161 is pressed during playback a video frame in the program chain currently being played back is displayed as a still image.

According to embodiments of the invention, receiver 190 is capable of distinguishing the STOP and PAUSE commands. Further, receiver 190 can distinguish the commands even when sender 150 stops providing video frames to receiver 190 in both the STOP and PAUSE modes of operation.

User Command Encoding

In a playback mode of operation, storage device 210 provides PES packets stored in storage medium 212 comprising video packets 195. When sender 150 receives a command, for example, a command for normal play or trick play from user operable control device 160, processor 220 encodes an indication of the user-entered playback command for normal play or trick play into the PES packets provided by storage medium 212. For example, when the command is a trick play command, controller 284 provides packets from storage medium 212 having a trick play indicator indicating trick play mode and sends the packets in video packets 195. In conventional systems, the indicator is a trick mode bit that is typically set for trick mode data packets. According to the invention, a command encoder at the output of memory medium 212 determines the setting of the trick play indicator of packets retrieved from memory. A processor, for example, processor 220 operates on the trick play indicator in accordance with the methods described herein.

Figure 4:
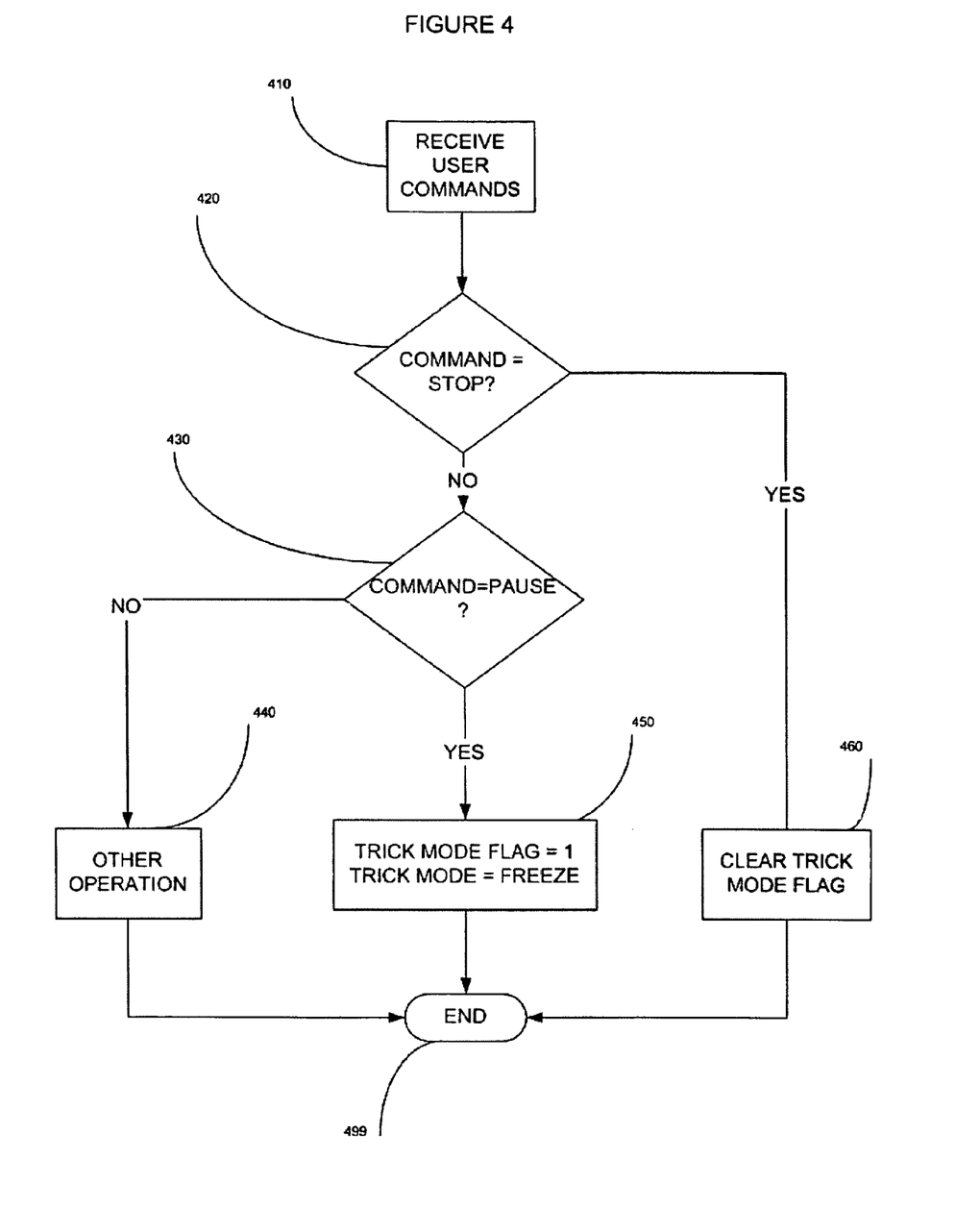
FIG. 4 is a flow chart illustrating the steps of a method for communicating stop and pause commands according to an embodiment of the invention.

FIG. 4 illustrates a flow chart of a processing method employed by processor 220 to implement, in cooperation with controller 283, a command encoding feature according to an embodiment of the invention. It will be appreciated that the flow chart of FIG. 4 illustrates but one advantageous encoder implementation and that other encoder implementations may also be used.

According to an example of the invention in use, a user initiates a command via a user operable control device, for example the device shown in FIG. 1 at 160. According to step 410 the user command is received. In an embodiment of the invention the command is provided to storage device controller 283. The command is processed by a processor to determine if the command is a Stop command, as indicated by step 420. In one embodiment of the invention, the aforesaid processor is included in storage device 210, e.g., in memory controller 283. In an alternative embodiment of the invention, the processor is an additional processor, e.g., processor 220. Regardless of where the processor is located, if the processor determines the received command is a STOP command, the processor encodes a stop command by operating upon at least one packet retrieved from memory medium 212. In one embodiment, in response to a Stop command, processor 220 ensures a trick mode flag in at least one of the packets retrieved from memory medium 212 is cleared, and forwards the at least one packet including the cleared flag to receiver 190.

On the other hand, if the processor determines the command issued by a user is not a STOP command, the processor further determines if the command is a PAUSE command as indicated at step 430. If the processor determines the command is not a PAUSE command the processor proceeds with another operation as illustrated by step 440. In that case, no further action is to be taken by the processor regarding the trick mode flag and the trick mode field of the PES packets. Other operations include executing a command other than stop or pause. The process end is illustrated at 499.

If the processor determines the command issued by a user is a PAUSE command, the processor encodes the pause command in a retrieved packet by setting a trick mode flag of a retrieved packet to 1 and further insures the trick mode field is set to indicate a freeze mode, as illustrated in step 450. In one embodiment of the invention, the trick_mode_control field is set to indicate freeze mode according to the settings shown in Table 2 below.

In one embodiment of the invention, when the Pause command is generated by the user operable control device, sender 150 obtains Intra picture (I picture) information from storage device 210 and instructs transfer of the I picture data to the PES packets for repeated display of an I frame on display 120.

Packetized Data 195

Figure 5:
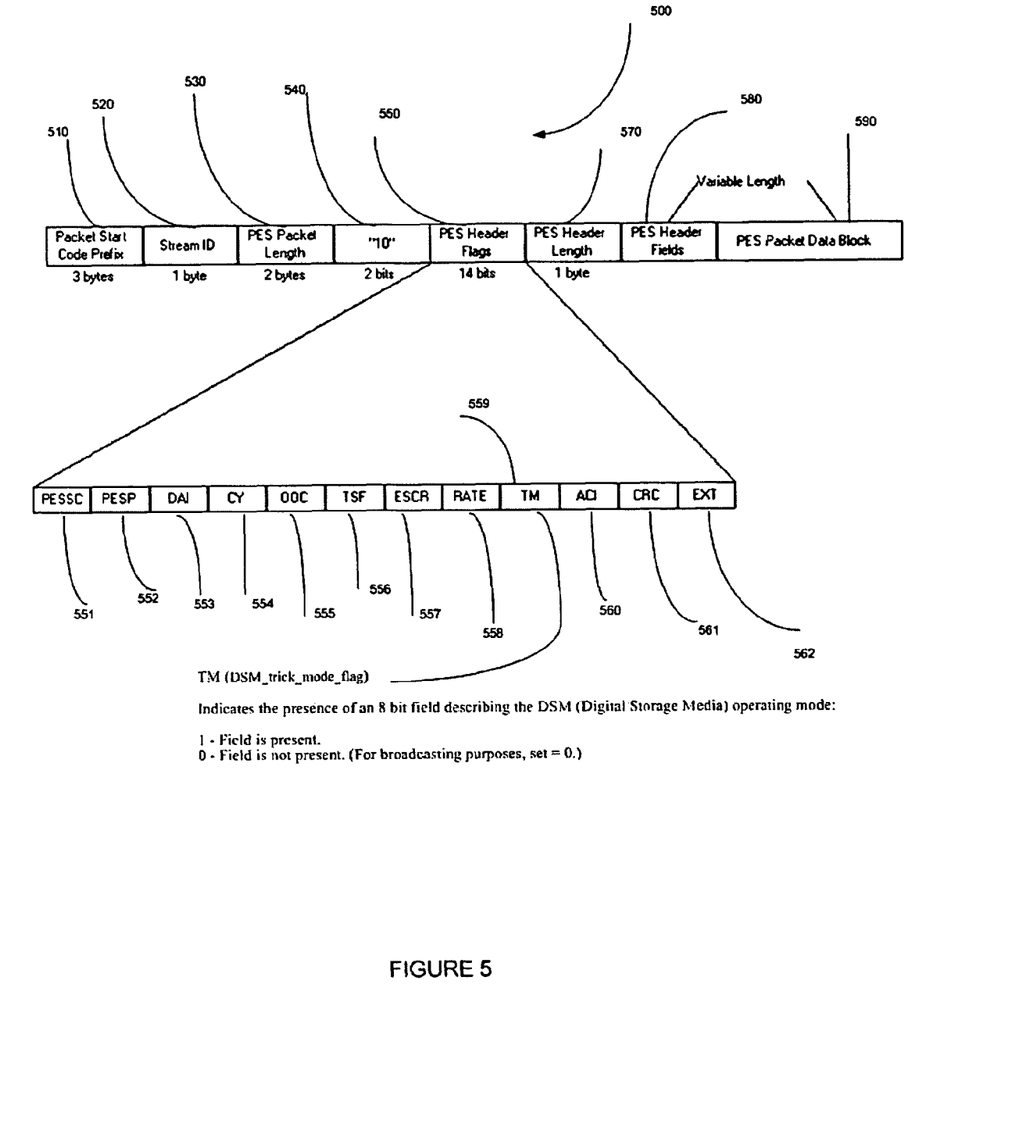
FIG. 5 illustrates a Packetized Elementary Stream (PES) including PES Header Flag portion and a PES Header Fields according to an MPEG format suitable for use with the invention.

FIG. 5 illustrates a format of an example packet 500 of video packets 195 according to an MPEG compliant embodiment of the invention. Example packet 500 is organized into a plurality of fields 510-590. According to an MPEG compliant packet format, a Primary Elementary Stream (PES) packet data block field 590 is followed by a PES header field 580, a PES Header length field 570, a PES header flag field 550, and other fields 540-510, as described in MPEG packet format specifications readily available in the art.

PES header flag field 550 comprises a plurality of indicator fields, i.e., flags 551-562. In particular, in an embodiment of the invention, Trick Mode TM flag 559 indicates the operating mode of storage device 210, as shown in Table 1.

TABLE 1

| | |
|---|---|
| Trick Mode (559) (DSM_trick_mode_flag) | Indicates the presence of an 8 bit field describing the DSM (Digital Storage Media) operating mode:<br>1 - Field is present.<br>0 - Field is not present. (For broadcasting purposes, set = 0.) |

Figure 6:
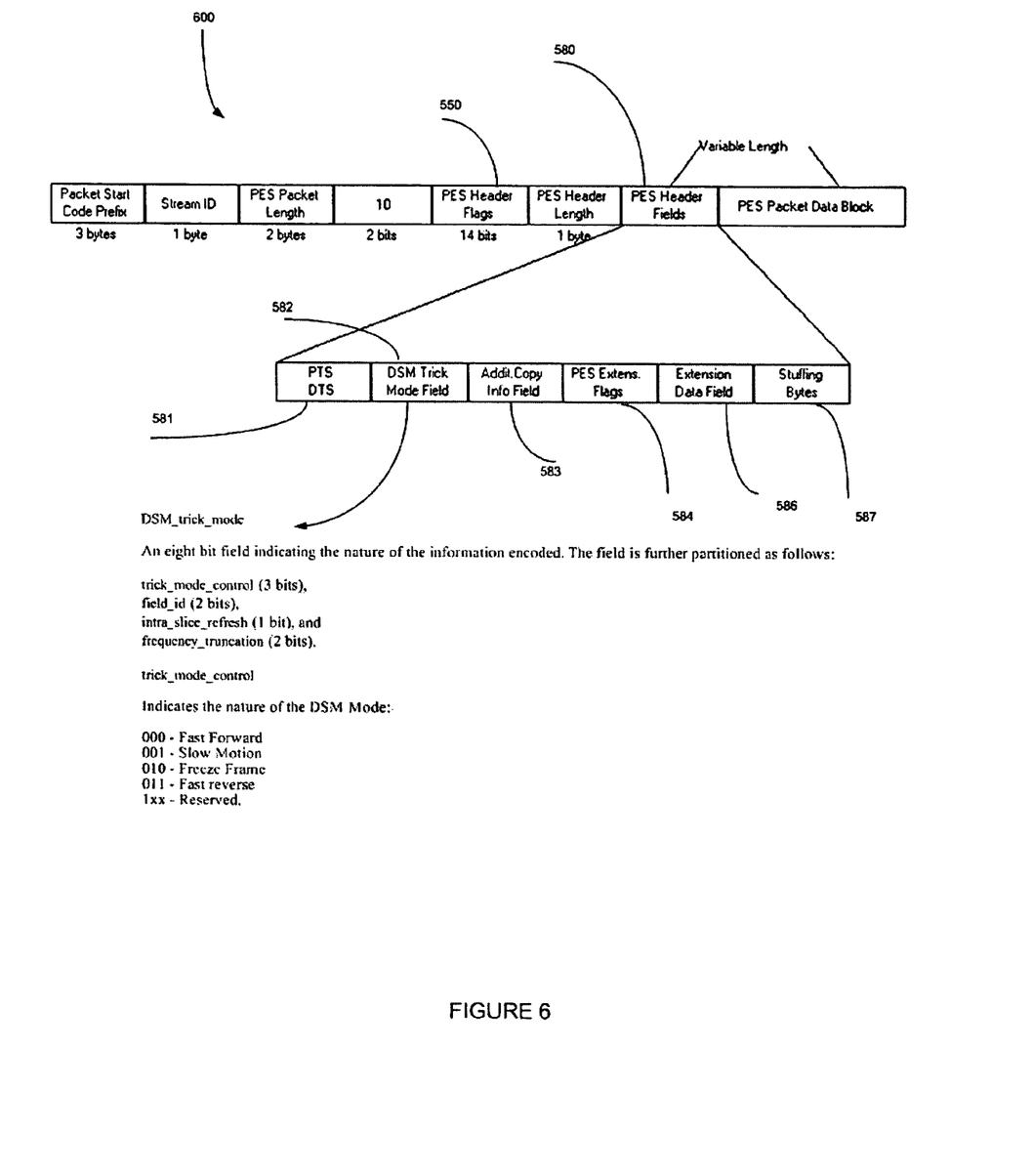
FIG. 6 illustrates a Packetized Elementary Stream (PES) including PES Header Flag portion and a PES Header Fields according to an MPEG format suitable for use with the invention.

FIG. 6 illustrates PES header fields 580 of packet 500. As shown, fields 580 comprise a plurality of fields 581-586 representing the Presentation Time Stamp (PTS), Decode Time Stamp (DTS), and Elementary Stream Clock Reference (ESCR), ES rate of twenty two bits, additional copy information of seven bits, previous PES Cyclic Redundancy Check (CRC) of sixteen bits and PES extension control.

In particular, a DSM trick mode control field 582 comprises eight bits of data.

DSM trick mode field 582 is used to indicate that a video stream originally stored on recording media (e.g., 212 of FIG. 1) is subjected to trick mode reproduction and differs from the corresponding source bit stream received at input 241 by sender 150. Table 2 describes DSM_trick_mode field 582.

TABLE 2

| | |
|---|---|
| DSM_trick_mode | An eight bit field indicating the nature of the information encoded. The field is further partitioned as follows: trick_mode_control (3 bits), field_id (2 bits), intra_slice_refresh (1 bit), and frequency_truncation (2 bits). |
| trick_mode_control | Indicates the nature of the DSM Mode:<br>000 - Fast Forward<br>001 - Slow Motion<br>010 - Freeze Frame<br>011 - Fast reverse<br>1xx - Reserved. |

Receiver 190

Receiver 190 includes an input 194 for receiving packetized data 195 including a command indicator from sender 150. Receiver 190 processes the video data in the packetized data stream and converts the video data to a form suitable for presentation on display device 120.

Decoder

Receiver 190 includes a processor 184 for implementing a decoder 252 for determining if a user has given a Stop or Pause command to sender 150. Processor 184 is informed by means of a 1 bit flag (DSM_trick_mode_flag) in the PES packet header indicating that the bitstream is reconstructed by DSM in trick mode, as described above, and in particular, as modified by sender 150 according to the principles of the invention. When the DSM_trick_mode_flag is set, an 8 bit field (DSM_trick_modes) follows. According to one embodiment of the invention, this field is encoded according DSM_trick_modes semantics defined in the ISO/IEC 13818-1. D.11.1, and further encoded by sender 150 of the invention to indicate Stop and Pause commands. Processor 184 decodes the bitstream and displays it according to DSM_trick_mode, if any, identified in the 8 bit trick mode field (582 of FIG. 6). According to one embodiment of the invention, If the DSM trick mode field contains a PAUSE code, a video decoder of receiver 290 decodes the picture and displays the latest received I frame until the next picture is decoded.

In that way, processor 184 comprises a decoder 252 for determining a user command based on a command indicator. Processor 184 makes this determination, at least in part, by detecting the state of the command indicator in the packetized data stream. Receiver 190 cooperates with display device 120 to display video images in accordance with the user command determined by processor 184.

Figure 7:
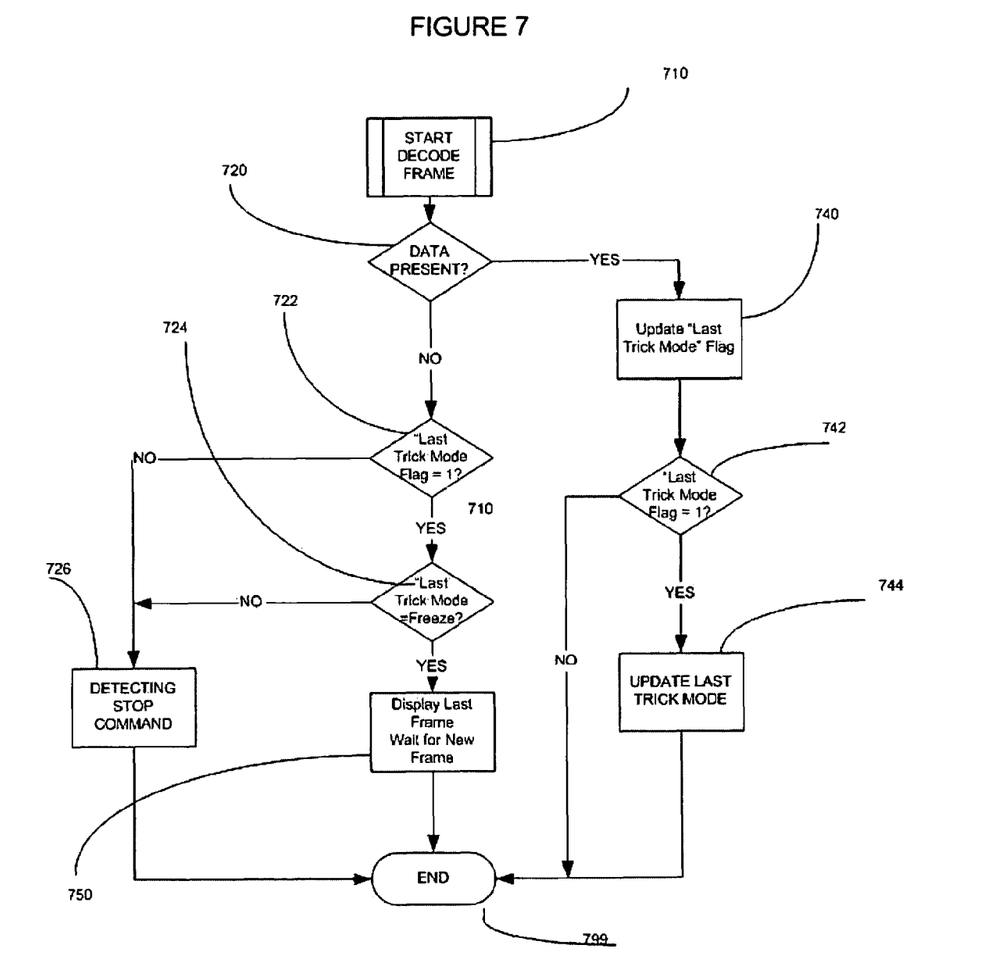
FIG. 7 is a flow chart for illustrating the steps of a method for receiving stop and pause commands according to an embodiment of the invention.

Therefore, processor 184 implements a method for decoding video data packets so as to distinguish a stop command from a freeze command. FIG. 7 is a flow chart that illustrates exemplary modes of operation of receiver 190 as it displays the video corresponding to packetized data 195. It will be appreciated that the flow chart of FIG. 7 illustrates but one advantageous implementation and that other implementations are envisioned.

As discussed above, typical displays include a video decoder 185. However, the invention further includes an apparatus and method for decoding Stop Pause commands based on the status of the TM flag in received packets. A processor 184 has access to the packetized data provided by sender 150 such that it can provide the data contained therein to a video stream decoder. Similarly, processor 184 also has access to the frame index data structure such that processor 184 can use this information to facilitate implementation of TrickPlay of the video stream data.

FIG. 7 Receiving

FIG. 7 is a flow chart illustrating a method for receiving trick mode commands according to one embodiment of the invention. The method begins at step 710 when receiver 190 is receiving video data 195 from sender 150 as illustrated in FIG. 1.

According to step 720, receiver 190 checks frame decoder 252 to determine if frames are being decoded. As long video data packets 195 are decoded, processor 184 updates a trick mode flag 188. Trick mode flag 188 is implemented in receiver 190. In one embodiment of the invention, trick mode flag 188 is a specified bit in a memory of receiver 190.

According to step 740, processor 184 updates receiver trick mode flag 188 to reflect the state of the trick mode flag of respective received packets. As long as the trick mode flag field of the received packets is set, receiver trick mode flag 188 is set and the bits in trick mode field of data stream are decoded. In that case, processor 184 determines the designated trick play based on the contents of the bits in the field, and an indication of the trick mode, i.e., Fast Forward, Slow Motion, Freeze Frame and Fast Reverse, is provided via mode indicator 183 as indicated by step 744.

On the other hand, if data input to frame decoder 252 stops, step 720 continues with step 722. That is, when data is not present, the last trick mode flag 188 is checked. If the last trick mode flag 188 is set, mode indicator 183 is checked. If mode indicator 183 indicates "freeze frame", a Pause command is detected and a last received frame of data is repeatedly displayed on display 120. In one embodiment of the invention, the last received Intra coded reference frame (I frame) is repeatedly displayed.

In the event no data is present as per step 720 and the "last trick mode" indicator 188 is not set (i.e., the flag is cleared), then a Stop command is detected. In that case, a last received frame of data is not repeatedly displayed on display 120.

In light of the foregoing description of the invention, it will be recognized that the present invention can be realized in hardware, software, or a combination of hardware and software. Communicating according to the present invention can be realized in a centralized fashion, or in a distributed fashion where different video processing elements are spread across several interconnected systems. Advantageously, in such an entertainment system, the information file can be used to communicate information between independently and remotely located MPEG decoders. Any kind of computerized or digital MPEG processing system, or other apparatus adapted for carrying out the methods described herein, is suited.

Although the present invention as described herein contemplates a CPU 122 of FIG. 1, a typical combination of hardware and software can further include a general purpose computer system with a computer program that, when being loaded and executed, controls the digital video recording and playback system similar to the control section 120 of FIG. 1, such that it carries out the methods described herein. The present invention can also be embedded in a computer program product which comprises all the features enabling the implementation of the methods described herein, and which when loaded in a computer system is able to carry our these methods.

The description above is intended by way of example only and is not intended to limit the present invention in any way, except as set forth in the following claims.

I claim:

1. A method for communicating stop and pause commands in a video recording and playback system, comprising the steps of:
   in response to a pause command, setting a trick mode indicator of a last frame of video data to be displayed to indicate a freeze trick mode; and
   in response to a stop command, clearing a trick mode indicator of a last frame of video data to be displayed.

2. The method of claim 1, further comprising communicating said video data to a display device.

3. The method of claim 1, wherein said video data comprises packetized data.

4. An apparatus for a video recording and playback system, comprising:
   a storage device for storing at least video data;
   a controller in communication with said storage device for controlling the selection of stored video data to be displayed;
   a processor in communication with said controller, said processor configured to perform the steps of:
      in response to a pause command, setting a trick mode indicator of a last frame of said video data to be displayed to indicate a freeze trick mode; and
      in response to a stop command, clearing a trick mode indicator of a last frame of said video data to be displayed.

5. The apparatus of claim 4, wherein said trick mode indicator comprises a trick mode flag of an MPEG-2 compliant video packet.

6. The apparatus of claim 4, wherein said video data comprises frames of video data having a packet format.

7. The apparatus of claim 6, wherein said packet format comprises an DSM-CC compliant video packet format.

8. The apparatus of claim 4, wherein said packet format comprises an MPEG-2 compliant video packet format.

9. The apparatus of claim 4, wherein said apparatus comprises a personal video recording device.

10. A video system including:
    a sender including at least an input for receiving video data and an output for communicating packetized video data to a receiver;
    said sender responsive to user commands;
    said receiver including at least an input for receiving said packetized data and an output for providing corresponding video images formatted for display; and
    a user operable control device for communicating said user commands to said sender, said commands including at least a pause command and a stop command;
    wherein in response to a received pause command, said sender sets a trick mode indicator of a last frame of said packetized video data to be communicated to said receiver to indicate a freeze trick mode and in response to a received stop command, said sender clears a trick mode indicator of a last frame of said packetized video data to be communicated to said receiver; and
    wherein in response to a determination by the receiver that packetized video data is no longer being received, the receiver examines a trick mode indicator of a last frame of received video data and if a trick mode indicator of the last received frame of video data indicates a freeze trick mode, the last received frame of video data is repeatedly displayed on a display, and if a trick mode indicator of the last received frame of video data is clear, the display of frames of said video data on the display is stopped.

11. The system of claim 10, further comprising a display for displaying frames of said video data.

12. The system of claim 10, wherein said system comprises a high definition television system.

13. The system of claim 10, wherein said sender comprises a personal recording device and said receiver comprises an MPEG compliant video decoder.

* * * * *